US012346904B2

United States Patent
Bathen et al.

(10) Patent No.: US 12,346,904 B2
(45) Date of Patent: Jul. 1, 2025

(54) NOMADIC SMART CONTRACTS MIGRATED ACROSS BLOCKCHAIN LEDGERS

(71) Applicant: International Business Machines Corporation, Armonk, NY (US)

(72) Inventors: Luis Angel Bathen, San Jose, CA (US); Marc Henri Coq, Hopewell Junction, NY (US); Eric Kevin Butler, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 18/517,669

(22) Filed: Nov. 22, 2023

(65) Prior Publication Data

US 2025/0165969 A1    May 22, 2025

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
None
See application file for complete search history.

(56) References Cited

U.S. PATENT DOCUMENTS

| 8,560,366 | B2 | 10/2013 | Mikurak et al. |
| 10,547,687 | B2 | 1/2020 | Lotter et al. |
| 10,812,274 | B2 | 10/2020 | Back et al. |
| 10,871,948 | B1 | 12/2020 | Dowling et al. |
| 11,038,771 | B2 | 6/2021 | Padmanabhan et al. |
| 11,244,313 | B2 | 2/2022 | Padmanabhan et al. |

(Continued)

FOREIGN PATENT DOCUMENTS

| CN | 108256864 B | 6/2019 |
| CN | 113467888 A | 10/2021 |

(Continued)

OTHER PUBLICATIONS

Bitcoin is an innovative payment network and a new kind of money. https://bitcoin.org/en (Accessed on Sep. 13, 2023), 3 pages.

(Continued)

*Primary Examiner* — Quang N Nguyen
(74) *Attorney, Agent, or Firm* — Tutunjian & Bitetto, P.C.; Michael A. Petrocelli (57) ABSTRACT

Migration of smart contracts across blockchain ledgers is described herein. Different decentralized ledgers are first cross-compiled. A verifiable smart contract is employed that will adhere to the rules of the ledger being targeted from the decentralized ledgers, and each of the smart contracts can be modeled as a state machine. Each of the smart contracts can be verified for correctness. At least one smart contracts that completes the verification process is installed across the different decentralized ledgers. At least one smart contract is approved with a verification process for confirming equivalency to deploy across the decentralized ledgers. The smart contracts are deployed across the decentralized ledgers.

17 Claims, 7 Drawing Sheets

(56) References Cited

U.S. PATENT DOCUMENTS

| | | | |
|---|---|---|---|
| 11,588,619 | B2 | 2/2023 | Revankar et al. |
| 11,880,824 | B1 * | 1/2024 | Witchey ............. G06Q 20/3672 |
| 12,081,532 | B1 * | 9/2024 | Haber ................... H04L 9/0825 |
| 2015/0379510 | A1 | 12/2015 | Smith et al. |
| 2017/0008555 | A1 | 1/2017 | Kitamura et al. |
| 2017/0085555 | A1 | 3/2017 | Bisikalo et al. |
| 2018/0343339 | A1 | 11/2018 | Lotter et al. |
| 2019/0172026 | A1 | 6/2019 | Vessenes et al. |
| 2019/0279206 | A1 | 9/2019 | Song et al. |
| 2019/0392178 | A1 | 12/2019 | Rice et al. |
| 2019/0392438 | A1 | 12/2019 | Rice et al. |
| 2019/0392536 | A1 | 12/2019 | Rice et al. |
| 2020/0058020 | A1 * | 2/2020 | Natarajan ................. H04L 9/50 |
| 2020/0302527 | A1 * | 9/2020 | Lyadvinsky ........... G06Q 40/04 |
| 2020/0327545 | A1 | 10/2020 | Xie et al. |
| 2022/0261882 | A1 * | 8/2022 | Youb ...................... G06Q 50/16 |
| 2022/0374870 | A1 | 11/2022 | Wilson et al. |
| 2023/0196342 | A1 | 6/2023 | Mullen et al. |

FOREIGN PATENT DOCUMENTS

| | | |
|---|---|---|
| CN | 108805561 B | 6/2023 |
| JP | 2020521373 A | 7/2020 |

OTHER PUBLICATIONS

Weaver: DLT Interperability. https://github/com/hyperledger-labs/weaver-dlt-interperability (Accessed on Sep. 13, 2023), 9 pages.
Welcome to Etherum. https://etherum.org/en (Accessed on Sep. 13, 2023), 11 pages.
Inter-Blockchain Communication. https://ibcprotocol.org/ (Accessed Sep. 13, 2023), 3 pages.

* cited by examiner

NOMADIC SMART CONTRACTS MIGRATED ACROSS BLOCKCHAIN LEDGERS

BACKGROUND

The present invention generally relates to smart contracts, and more particularly to migratory smart contracts.

Bitcoin (Bitcoin—Open source P2P money) is an example of digital currency that shows the potential of programmable money. Bitcoin currency includes the ability to program into the money basic concepts, such as if-this-then-that terminologies. For example, escrow systems in Bitcoin operate by requiring multi-signatures in order to make a transaction final. This can mean that the transfer between two or more parties could be conditional on 2-of-3 signatures, or both parties agreeing to the exchange via 2-of-2 signatures.

Moreover, it is possible to put time-locks into when a transaction is to be executed. The OP_RETURN operator for example enables the transactions to have encoded information in the Blockchain. This means that we can use the 40 Bytes of available data space to encode simple messages or codes for use by applications outside of the Blockchain. The idea of programmable money extends to the concept of smart-contracts. This opened up new opportunities, from new financial markets such as decentralized finance (DeFi), to decentralized venture capital systems (VCs), to non-fungible tokens (NFTs), etc.

Smart-contracts then could be responsible for things like how to register and validate school certifications, mortgage titles, etc. Some drawbacks of these smart-contracts include that they are 1) blockchain specific and 2) executing a smart contract requires a fee. This fee depends on the ledger the smart-contract is present on. This can mean that invoking a smart-contract when the underpinning crypto currency is has high valuation, can be too expensive to be economically feasible.

SUMMARY

In accordance with an embodiment of the present invention, a computer implemented method is described for managing smart contracts. The computer implemented method may include cross-compiling different decentralized ledgers, generating at least one smart contract that adheres to the rules of a ledger being targeted from the decentralized ledgers, and modeling the at least one smart contract as a state machine. The computer implemented method may further include verifying each of the at least one smart contracts according to a verification process. In some embodiments, each of the decentralized ledgers having an equivalent state machine that runs smart contract logic and generate deterministic results to achieve consensus. The computer implemented method may also include installing the at least one smart contracts that complete the verification process across the different decentralized ledgers; and approving the at least one smart contracts with a verification process for confirming equivalency to deploy across the decentralized ledgers. The computer implemented method can include deploying the smart contracts across the decentralized ledgers.

In another aspect, a system is provided for managing nomadic smart contracts. The system may provide for detecting duplicate tables including a hardware processor; and a memory that stores a computer program product. The computer program product of the system includes instructions that include to cross-compile, using the hardware processor, different decentralized ledgers; and generate at least one smart contract that adheres to the rules of a ledger being targeted from the decentralized ledgers. The computer program product of the system can also model, using the hardware processor, the at least one smart contract as a state machine, and verify each of the at least one smart contracts according to a verification process. In some embodiments, each of the decentralized ledgers having an equivalent state machine that runs smart contract logic and generate deterministic results to achieve consensus. The computer program product of the system can then install, using the hardware processor, the at least one smart contracts that complete the verification process across the different decentralized ledgers, approve the at least one smart contracts with a verification process for confirming equivalency to deploy across the decentralized ledgers, and deploy using the hardware processor, the smart contracts across the decentralized ledgers.

In yet another aspect, a computer program product is described for managing nomadic smart contracts. The computer program product may include a computer readable storage medium having computer readable program code embodied therewith, the program instructions executable by a processor to cause the processor to cross-compile different decentralized ledgers; and generate at least one smart contract that adheres to the rules of a ledger being targeted from the decentralized ledgers. The computer program product can also model the at least one smart contract as a state machine, and verify each of the at least one smart contracts according to a verification process. In some embodiments, each of the decentralized ledgers having an equivalent state machine that runs smart contract logic and generate deterministic results to achieve consensus. The computer program product can then install the at least one smart contracts that complete the verification process across the different decentralized ledgers, approve the at least one smart contracts with a verification process for confirming equivalency to deploy across the decentralized ledgers, and deploy using the hardware processor, the smart contracts across the decentralized ledgers.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In accordance with one embodiment of the present disclosure, computer implemented methods, systems and computer program products are described herein that provide for nomadic smart contracts, and cost efficient smart contracts. More particularly, in some examples, the computer implemented methods, systems and computer program products that are described herein can rely upon the concept of migratory smart-contracts. A "migratory smart contract", as described herein, has the ability to migrate between ledgers according to user-defined policies. The user-defined policies can allow for migration between ledgers based upon the occurrence of a triggering even, such as the size of a memory pool (e.g., how many transactions are pending validation), current hash rate (how much horse power there is in the ecosystem), value of currency (how expensive it is to invoke the smart-contract), how green the blockchain is (e.g., some eco-friendly rating), etc. In some embodiments, users can define the policy they wish their smart-contracts to follow. In some embodiments, data for the smart contract can be written in a common standard (e.g., JSON) that is parse-able across any ledger.

The computer implemented methods, systems and computer program products are now discussed with greater detail with reference to FIGS. 1-7.

Figure 1:
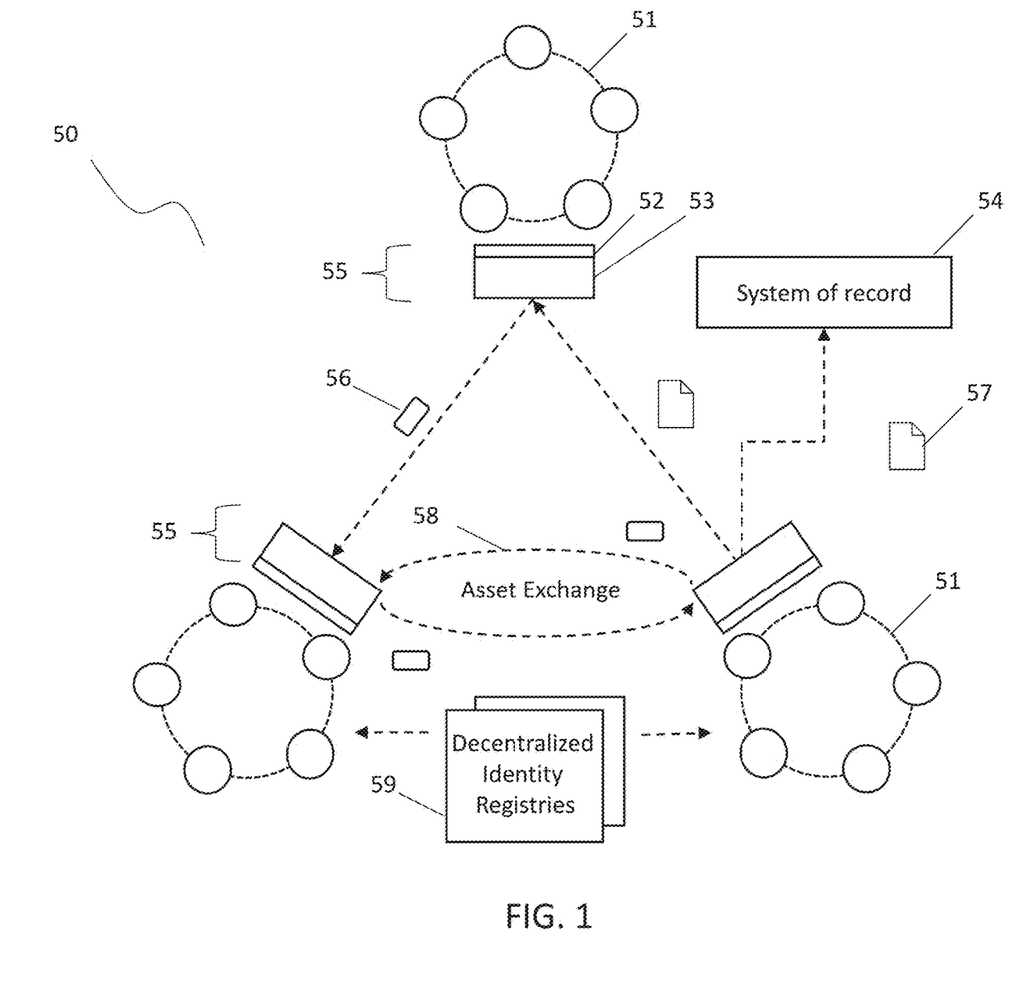
FIG. 1 is an illustration depicting one embodiment of inter-block communication by which the computer implemented methods, systems and computer program products employ the migratory smart contracts.
Figure 2:
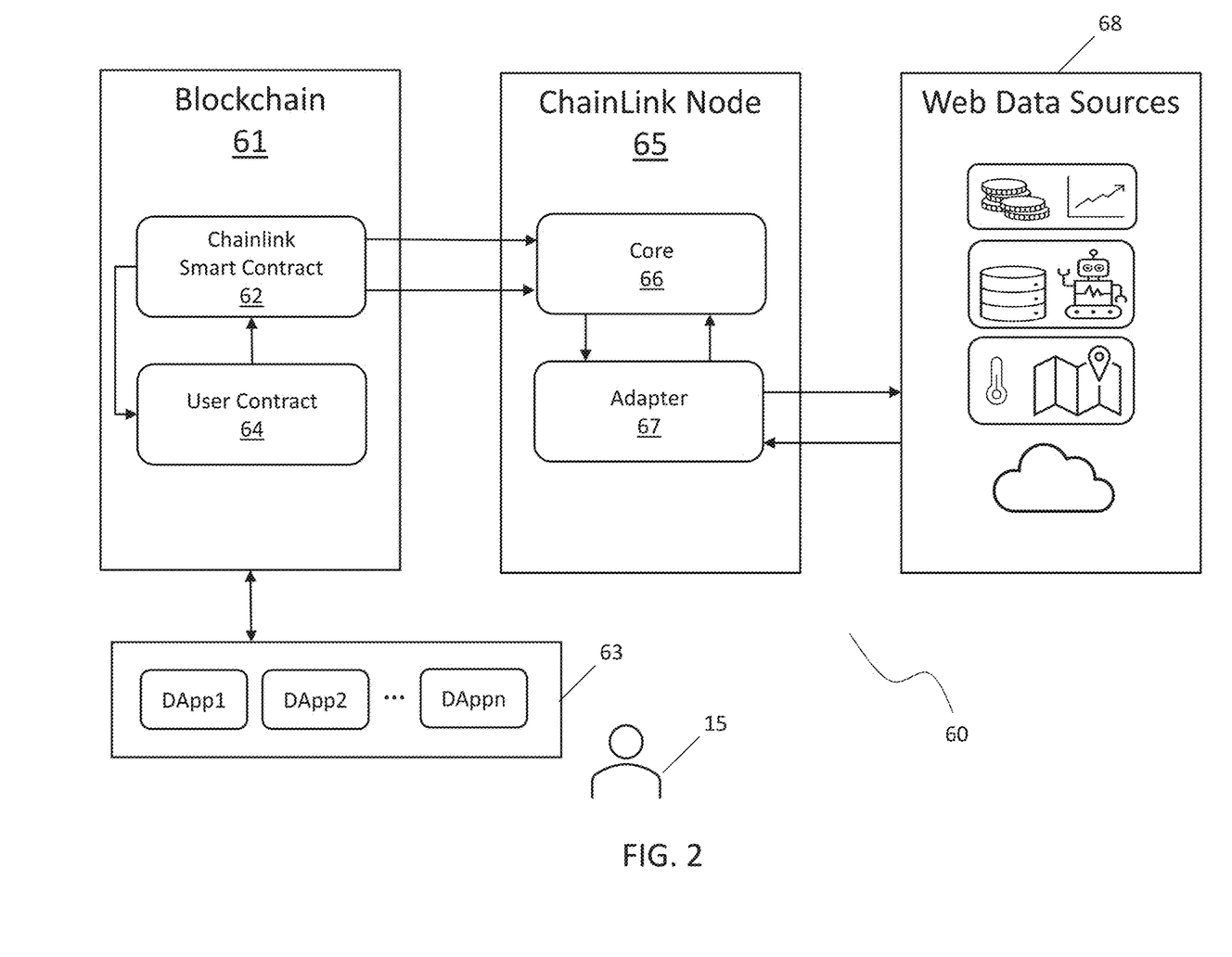
FIG. 2 is an illustration depicting one embodiment of chain-linked oracles by which the computer implemented methods, systems and computer program products employ the migratory smart contracts.

FIGS. 1 and 2 are illustrations depicting some examples of inter-block communication and chain-linked oracles by which the computer implemented methods, systems and computer program products employ the migratory smart contracts of the present disclosure. In order to support smart-contract migration the computer implemented methods, systems and computer program products leverage inter-blockchain communication, and trusted oracles.

A "blockchain" is a growing list of records, called blocks, which are linked using cryptography. In some examples, each block contains a cryptographic hash of the previous block, a timestamp, and transaction data. Blockchain oracles are entities that connect blockchains to external systems, thereby enabling smart contracts to execute based upon inputs and outputs from the real world. "Oracles" are data sources for a blockchain that support smart contract protocols, and can be referenced to determine if a predefined condition has been met, thus triggering an on-chain action. For example, prediction market applications can use oracles to determine whether a predetermined condition has been met for a particular event, and as a result settle payments based on the occurrence of the particular event.

First, inter-blockchain communication relies on the idea that communication between ledgers should not affect the ledger's ability to operate and conduct business as usual, as well as any transaction executed on a ledger, that relies on data from a different ledger maintains the same level of trust as if it is executed on the current leger. For example, when a coin/asset is transferred to another blockchain with the promise that the asset will be equivalent there are two ways for this to be accomplished.

A first method is for an exchange to trade token A for ledger A to token B in ledger B, where the exchange has an existing pool of B tokens, so as long as the exchange has that B token in its funds, it can guarantee the transfer, or it will need to purchase it from someone in ledger B market.

A second method is to use an exchange mechanism with a burn capability. This method can include sending token A to a burn address in ledger A, and a token B being minted in ledger B of equal value to A. In this scenario, by burning asset A, the method essentially guarantees that asset A is never used in ledger A again, and its uniqueness is transferred to asset B.

FIG. 1 illustrates one embodiment of a high-level diagram of the Hyperledger Weaver architecture 50. The hyperledger weaver architecture 50 is a platform, a protocol suite, and a set of tools, to enable interoperation for data sharing and asset movements between independent networks built on heterogeneous blockchain, or more generally, distributed ledger, technologies, in a manner that preserves the core blockchain tenets of decentralization and security.

The architecture depicted in FIG. 1 relies upon the idea of relays 55. In some embodiments, each relay 55 is an entity within its respective ledger 51, which operate as DLT-specific drivers 52 to route cross-network requests and responses. More particularly, the relay 55 can implement interoperability protocols. The protocol driver 52 can map syntax, semantics, and policies to underlying distributed ledger technologies (DLT) protocols. In accordance with the computer implemented methods, systems and compute program products, the architecture depicted in FIG. 1 can serve as one exemplar underlying technology that would allow transactions from one ledger to migrate to a new ledger 51 when necessary, as well as provide the ability to prove transaction provenance when needed between ledgers. In blockchain ledgers, provenance is a way to trace the origin and sequence of transaction such that there is no dispute about the origin and sequence of the transaction in the ledger.

The architecture depicted in FIG. 1 can provide for asset transfer 56. Asset transfer 56 includes state and cryptographic proof data. The architecture depicted in FIG. 1 can provide for data transfer 57. Data transfer 57 can include state and cryptographic proof data.

The architecture depicted in FIG. 1 can include an enterprise system of record 54. The enterprise system of record 54 may provide the ability of the architecture 50 to prove transaction provenance when needed between ledgers 51.

The architecture depicted in FIG. 1 can also include a decentralized identity registry 59. The decentralized identities (DIDs) provide a unified and standard cross chain identity system for organizations, people and objects. The decentralized identity registry 59 may provide the ability of the architecture 50 to prove transaction provenance when needed between ledgers 51.

The architecture depicted in FIG. 1 can provide asset exchange between ledgers 51 as identified by reference number 58. The asset exchange can include state and cryptographic proof data.

FIG. 2 is an illustration depicting one embodiment of chain-linked oracles by which the computer implemented methods, systems and computer program products employ the migratory smart contracts. Oracles, e.g., trustworthy oracles, are another concept used by the systems methods and computer program products to employ migratory smart contracts. In some examples, the essence of blockchain smart contracts lies in the execution of business logic code in a decentralized architecture in which the execution outcomes are trusted and agreed upon by all the executing nodes. Despite the decentralized and trustless architectures of the blockchain systems, in some instances, smart contracts on their own do not access data from the external world. Smart contracts interact with off-chain external data sources, called oracles, whose primary job is to collect and provide data feeds and input to smart contracts. However, there is risk of oracles providing corrupt, malicious, or inaccurate data.

The blockchain-oracle workflow is typically executed among three types of participants i.e. 1) data feed providers, 2) oracle nodes/network operators, and 3) blockchain operators. The data feed providers enable different Web APIs and communication interfaces to read and provide data from various online data sources such as sensors, stock markets, crypto-exchanges, and web-enabled ERPs to oracle nodes. The oracle node operators enable notarization and certification policies to transfer highly accurate, relevant, and reliable data to blockchain systems. The blockchain operators enable the ecosystems to securely and safely execute the smart contracts on underlying peer to peer networks.

The issues of trust may arise due to any of the participants. For example, the data feed providers may continuously report the corrupt or malicious data or the data feeds may get compromised where the adversarial attacks could be penetrated into oracles to alter their notarization and certification policies. Similarly, adversaries could attack through oracles to manipulate the data feeds to get favorable reputations from the blockchains. The adversaries could also attack the blockchain networks to profit from their consensual processes and benefit from their mining algorithms. Therefore, the notion of trust in blockchain oracles, in a broader sense, encapsulates the activities of all the participants on the network. Hence the trust models should comply with the security, privacy, reliability, authenticity, and reputation of all the stakeholders.

The data source for oracles can include software and hardware. Software oracles deal with data originated from online sources on the Internet, browsing through these data to find the information it needs, extracting the required information and returning it to the smart contract. A few examples of data that software oracles can gather are gold price, flight delays, and currency exchange rates.

Hardware oracles gather data directly from the physical world by means of things such as scanners and sensors. A few examples for hardware oracles include RFID sensors to track supply chain goods, and temperature and humidity sensors in shipment containers.

Human oracles rely on people's actions to provide external data to blockchain systems. Human oracles provide smart contracts with answers to questions. For example, people can vote on the truth of an event.

Trusted oracles may employ a trust model. The number of nodes used by oracles to get data to smart contracts defines the trust model used by oracles. A centralized trust model relies on data from a single source. The efficiency in centralized trust model is high but it represents a single point of failure, where availability, accessibility, and level of certainty about the validity of the data depends only on one node. Decentralized trust model resolves the singular point of failure problem in the centralized trust model. However, these models bring higher latency for data processing with less efficiency, when compared with the centralized trust model.

Referring to FIG. 2, oracles 60 allow the blockchain 61 to act on data sources outside of the network. This is crucial as blockchains 61 have to be able to be deterministic in order to conserve their ability to do consensus. In blockchain, a consensus mechanism is a system that validates a transaction and marks it authentic. In order to perform consensus, they must be able to get the same input data when they execute the business logic within the smart-contracts 62. The block chain interactions with decentralized applications 63, e.g., DApp1, DApp2, . . . DAppn. The acronym "DApp" refers to a decentralized application. A decentralized application (DApp) is an application built on a decentralized network that combines a smart contract and a frontend user interface through which a user 15 may access the smart contract 62, e.g., via a user contract 64.

Further, the user contract 64 sends data requests to the chainlink smart contract 62. The chainlink smart contract 62 is in communication with the core 66 of the chainlink node 65, which provides the chainlink based oracle. The core 66 of the chainlink node 65 logs events from the chainlink smart contract and the core 66 can report data to the chainlink smart contract 62.

In order for the methods, systems and computer implemented products that provide migratory smart contracts to be able to take actions such as migration due to price volatility, the systems should be able to trust the pricing list for the different ledgers in the ecosystem.

There are various ways by which we can enable trusted oracles, from crowdsourcing-based schemes, to voting-based schemes, to blockchain-based oracles. These oracles serve as sources of truth for relaying information to blockchains. For example, as depicted in FIG. 2, the chainlink node 65 may be in communication with web based data sources 68. Similarly to inter-blockchain communication systems, oracles also have drivers for each of the various ledgers they support to ingest data and verify data from the oracles themselves. For example, the chainlink node 65 includes an adapter 67 that can make HTTP data request for the web data sources 68, and can retrieve data feeds from the web data sources 68.

Figure 3:
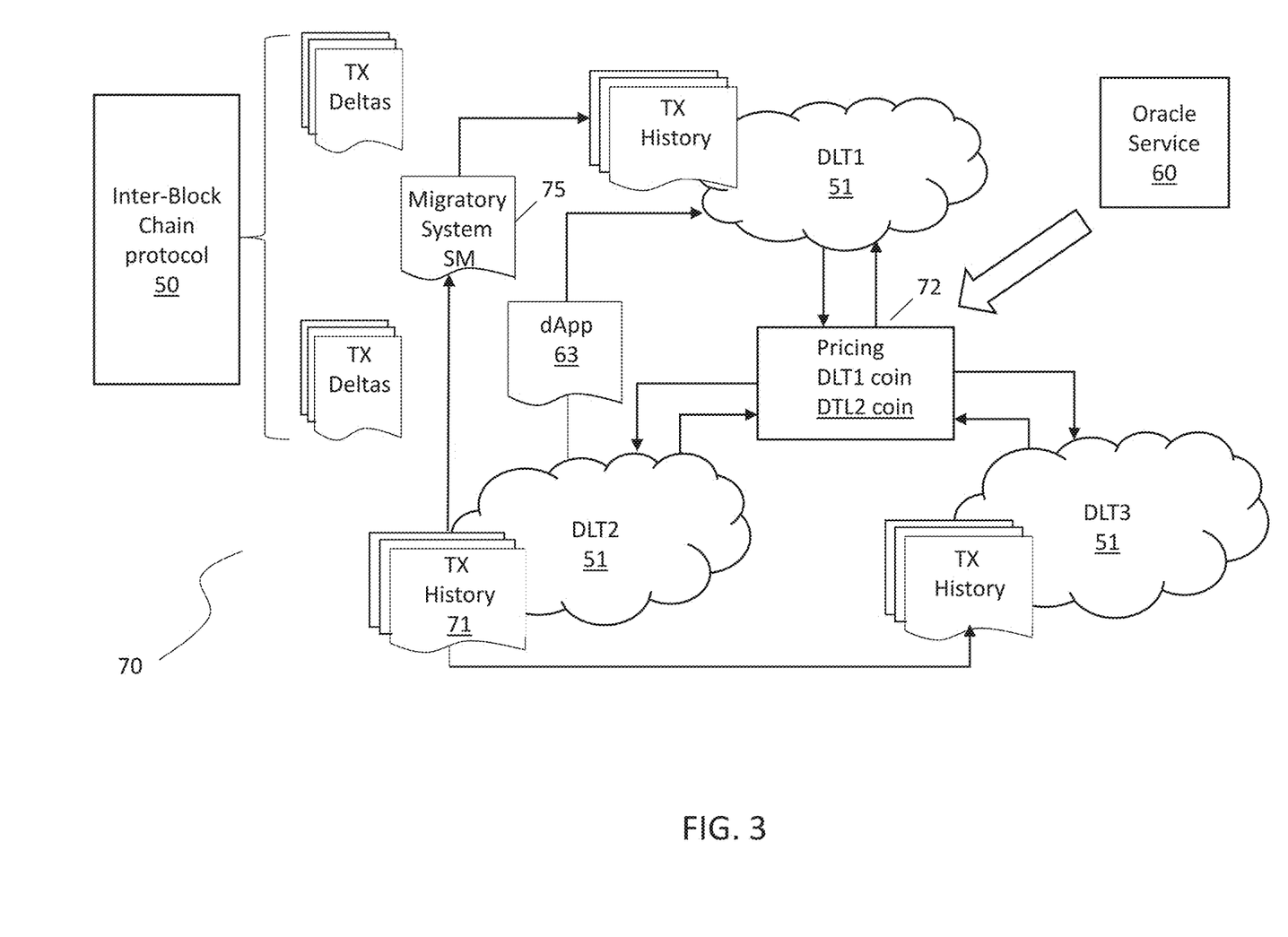
FIG. 3 illustrates a nomadic smart contract including an inter-blockchain protocol (IBC) enabler, as depicted in FIG. 1, and a trustworthy oracle, as depicted in FIG. 2, in accordance with one embodiment of the present disclosure.

FIG. 3 illustrates one embodiment of a nomadic smart contract 100 including the two above described core enablers: 1) an inter-blockchain protocol (IBC) enabler 50 (as depicted in FIG. 1) and a 2) trustworthy oracle 60, such as a ChainLink node 65 (as depicted in FIG. 2).

In some embodiments, the trustworthy oracle 60 provides the pricing lists 72 (e.g., pricing 72), mem-pool statistics, hash rate statistics, carbon profile statistics, etc., any statistic that the smart-contract application 63 would like to act upon. For example, FIG. 3 illustrates pricing 72 from each of the ledgers 51, e.g., DLT1 coin, DLT2 coin, DLT3 coin, etc., being recorded. These statistics will be available across all ledgers 51 (e.g., DLT1, DLT2, DLT3) in real-time as they will be connected to the same oracles 60. In some embodiments, decentralized applications (dApps) 63 are written in such a way that they can simultaneously check which smart-contract (SM) is active. Based on which smart-contract (SM) is active, they will then invoke transactions (TX) on the SM active, which in turn, will function as a native ledger specific smart-contract (SM).

Transactions (TX) will exist within each ledger 51, and each ledger 51 will have a transaction history (TX History) 71. Since the main reason for migration is that some metric (e.g., transaction fee) is too high, then the amount of transactions TX to be migrated will be on-demand and dependent on the smart contract's (SM's) needs. For example, a provenance application will need to pay for the invocation of the smart contract SM as well as any verification needed across a different ledger. This can be provided by the migratory system 75 for the smart contract (SM). This would mean we may incur the transaction TX fee on the host ledger, as well as the TX on the remote ledger.

To minimize this overhead, the computer implemented methods, systems and computer program products employ a smart migratory system 75, which will periodically transfer delta TX history 76 across ledgers 51 during a low transaction (TX) fee time. This means that the computer implemented methods, systems and computer program products can spread transactional header across ledgers 51 with minimal disruption, as well as minimal transaction fees (TX fees).

In some embodiments, since these transactions are minted on a specific ledger 51, and they do not need to be minted again (e.g., added to a new block on a separate blockchain). In some embodiments, as an option, each ledger can provide read-only services, through blockchain explorers. This means that it could very well be possible to treat these historical transactions TX 71 as external data. Therefore, the computer implemented methods, systems and computer program products, can then leverage the trustworthy oracle services 60 to read and verify data provenance.

Figure 4:
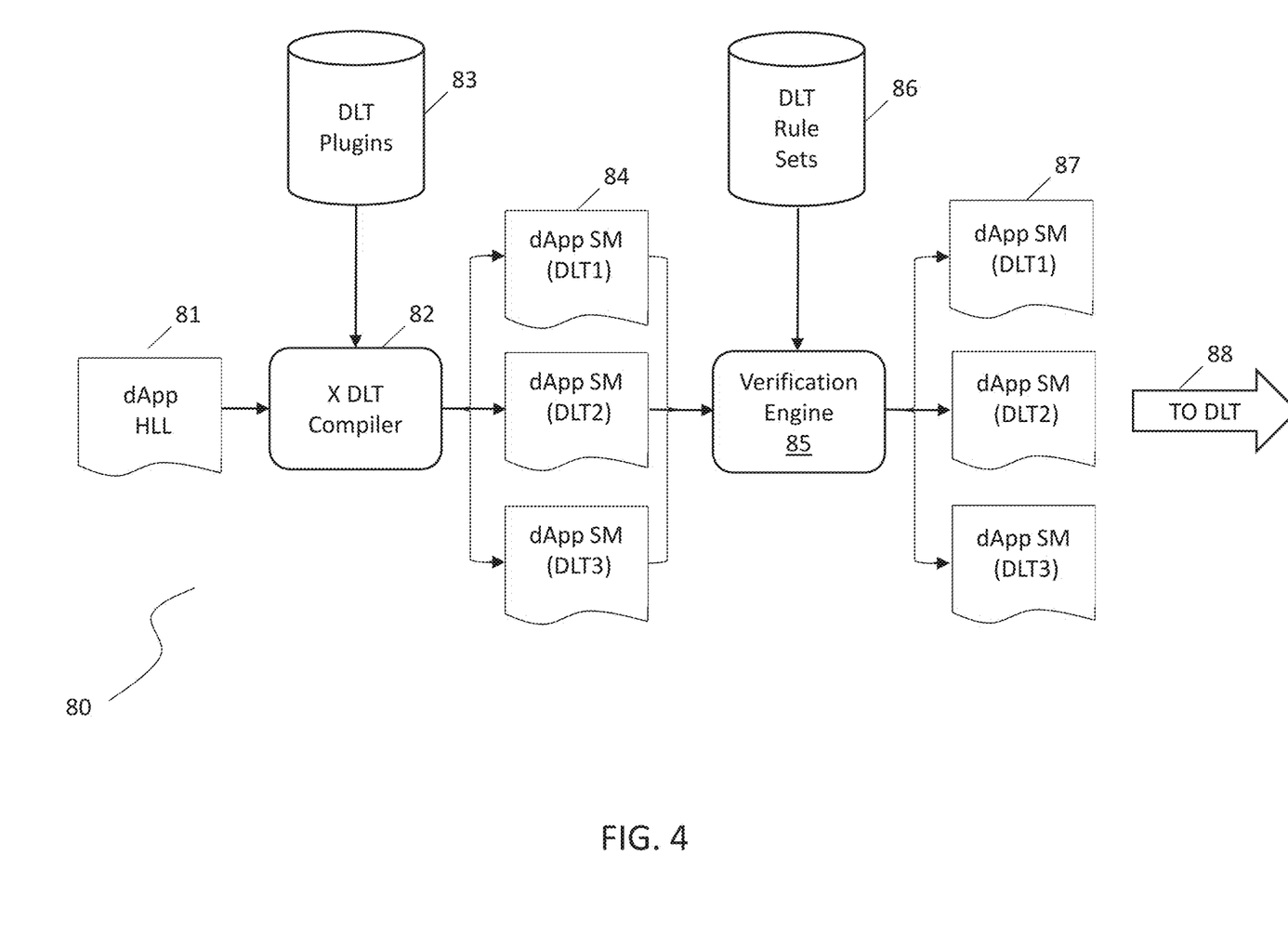
FIG. 4 is a block diagram illustrating multi-ledger smart contract generation, in accordance with one embodiment of the present disclosure.

FIG. 4 illustrates multi-ledger smart contract generation 80. In order to support migration across ledgers, the computer implemented methods, systems and computer program products can determine that the smart contract logic is in-fact equivalent across ledgers 51. In order to accomplish this, the computer implemented methods, systems and computer program products can leverage the concept of a high-level programing language (HLL) to provide a decentralized app (dApp) programmed using high-level programing language (HLL) 81. It could be written in any specific language (e.g., Go, Python, etc.). In some embodiments, this language would then be cross-compiled targeting different decentralized ledgers (DLTs) as long as there is a compatible plugin, e.g., DLT plug in 83. The cross-compiler 82 will generate a verifiable smart contract (dApp SM) 84 that will adhere to the rules of the ledger it is targeting. Each smart contract will be modeled as a state machine. A "state machine" is a mathematical abstraction used to design algorithms. A state machine reads a set of inputs and changes to a different state based on those inputs. A state is a description of the status of a system waiting to execute a transition.

Referring to FIG. 4, the smart contracts will then go through the formal verification engine 85 to verify for correctness and equivalency. Once the smart contracts (SMs) have gone through the verification process they will then be installed across the different ledgers 86.

Part of the verification process is running consensus on the results across the various smart contracts on the different ledgers. For example, the verification engine 85 may employ a decentralized ledger (DLT) rule set 86 to achieve consensus. The idea is that each ledger will have an equivalent simulator/state machine, that will run the smart contract logic and generate the necessary deterministic results to achieve consensus. Smart contracts 87, e.g., smart contract (SM) decentralized ledgers (DLT1), SM DLT2, and SM DLT3, are then signed off by the verifier, i.e., formal verification engine 85, and their equivalency can be then attested when deployed 87 across the ledgers 51.

Figure 5:
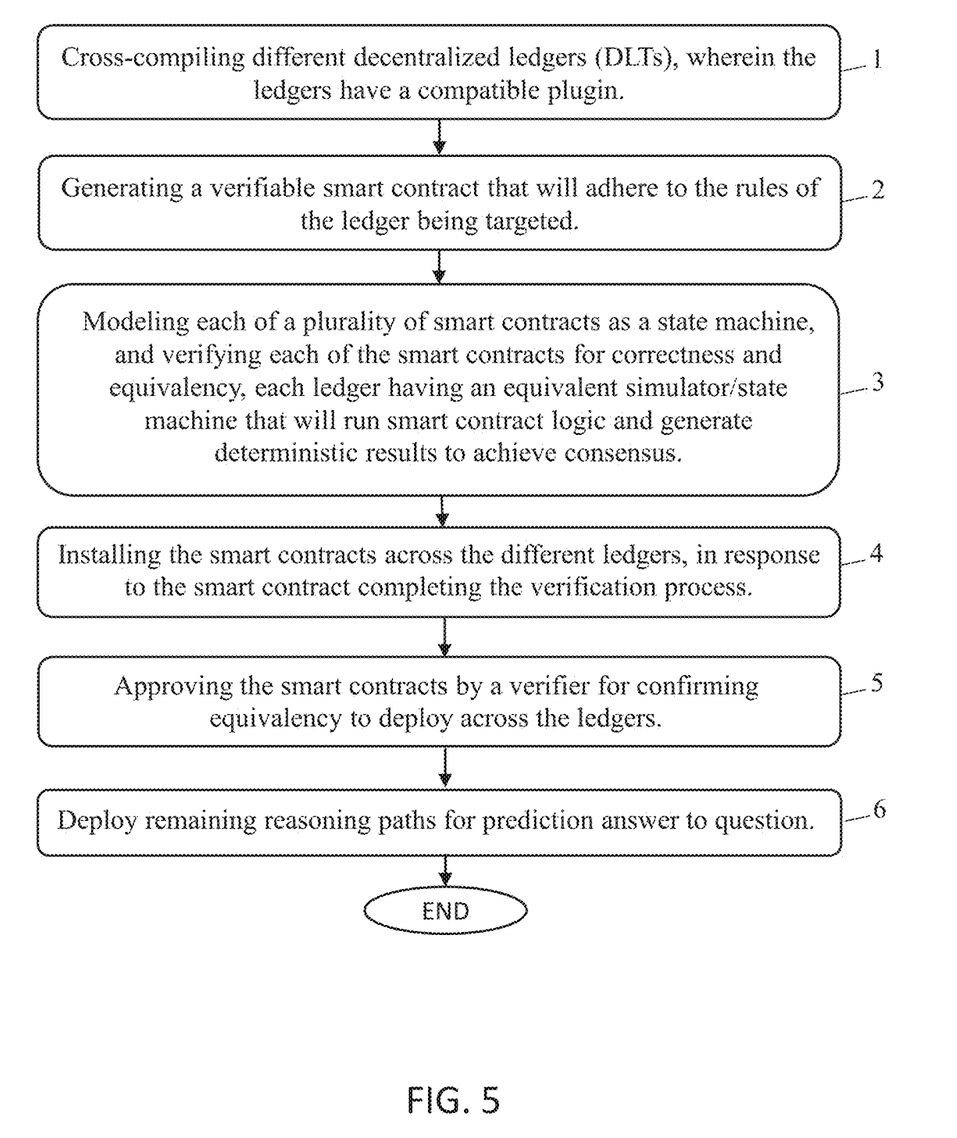
FIG. 5 a block/flow diagram showing a system/method of employing smart nomadic contracts, in accordance with an embodiment of the present invention.

FIG. 5 is a block/flow diagram showing a system/method of employing smart nomadic contracts. In some embodiments, the method for supporting data migration, e.g., a contract across blockchain ledgers, includes cross-compiling different decentralized ledgers (DLTs), wherein the ledgers have a compatible plugin at block 1.

Block 2 of the method can further include generating a verifiable smart contract that will adhere to the rules of the ledger being targeted.

Block 3 of the method can include modeling each of a plurality of smart contracts as a state machine, and verifying each of the smart contracts for correctness and equivalency, each ledger having an equivalent simulator/state machine that will run smart contract logic and generate deterministic results to achieve consensus. A finite-state machine (FSM) or finite-state automaton (FSA, plural: automata), finite automaton, or simply a state machine, is a mathematical model of computation. It is an abstract machine that can be in exactly one of a finite number of states at any given time. The FSM can change from one state to another in response to some inputs; the change from one state to another is called a transition.

Block 4 of the method can include installing the smart contracts across the different ledgers, in response to the smart contract completing the verification process.

Block 5 of the method can further include approving the smart contracts by a verifier for confirming equivalency to deploy across the ledgers.

Block 6 of the method also includes in response to the confirming of the equivalency, deploying the smart contracts across the ledgers.

Figure 6:
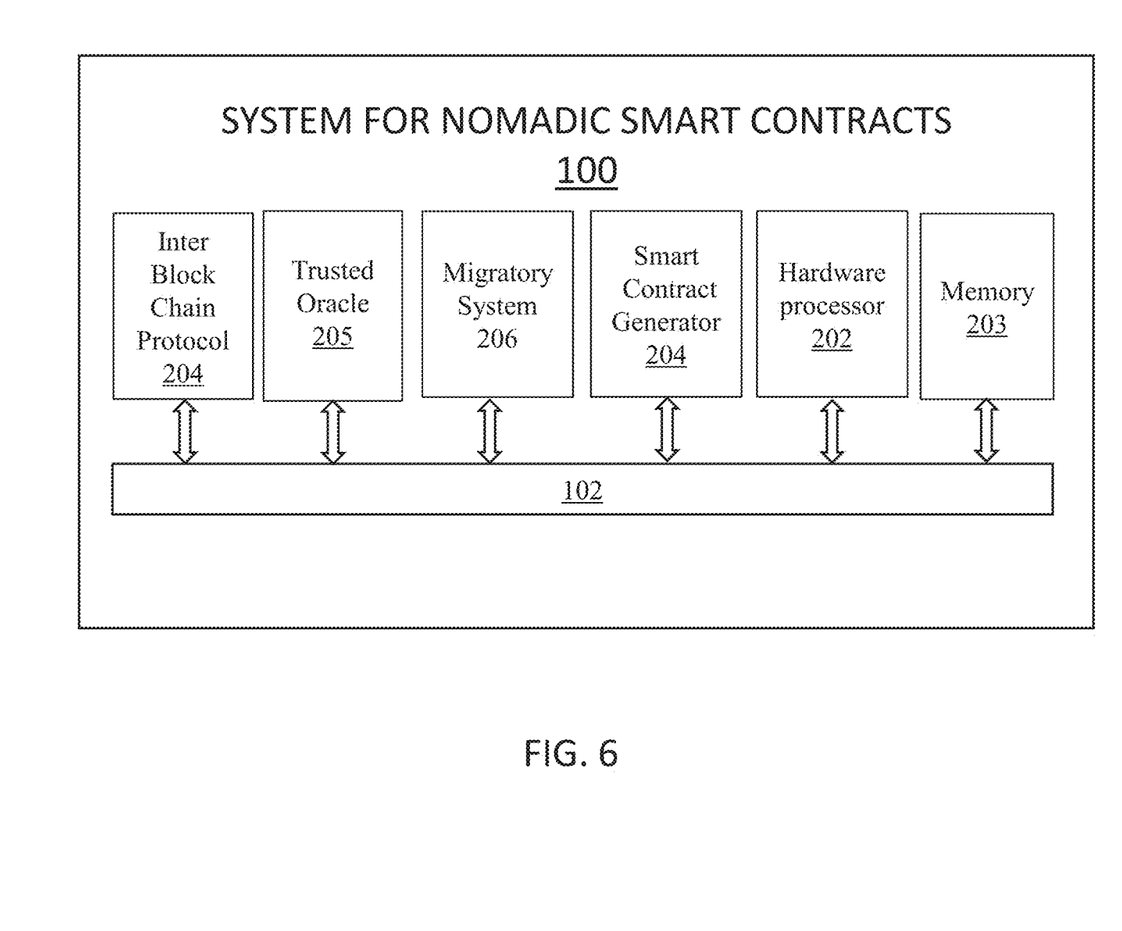
FIG. 6 is a block diagram illustrating a system for providing smart nomadic contracts, in accordance with one embodiment of the present disclosure.

In some embodiments, the computer implemented method that is depicted in FIGS. 1-5 may be performed by a system 100 for using nomadic smart contracts including a hardware processor 202, and a memory 203 that stores a computer program product, as depicted in FIG. 6. The computer program product of the system 100 includes instructions that can include to cross-compile, using the hardware processor 202, different decentralized ledgers; and generate at least one smart contract that adheres to the rules of a ledger being targeted from the decentralized ledgers. The computer program product can further include to model, using the hardware processor 202, the at least one smart contract as a state machine; and to verify each of the at least one smart contracts according to a verification process. Each of the decentralized ledgers having an equivalent state machine that runs smart contract logic and generate deterministic results to achieve consensus. The system can further install, using the hardware processor 202, the at least one smart contracts that complete the verification process across the different decentralized ledgers. The system can also approve, using the hardware processor 202, the at least one smart contracts with a verification process for confirming equivalency to deploy across the decentralized ledgers; and deploy the smart contracts across the decentralized ledgers.

The system 100 may include an inter block chain protocol 204 that can perform the functions described with reference to FIGS. 1, 3 and 5. The trusted oracle 205 can perform the functions described with reference to FIGS. 2, 3 and 5. The migratory system 206 can perform the migration of smart contracts across the different ledgers as described with reference to FIG. 3. The system may further include a smart contract generator 204 for performing the functions described with reference to FIGS. 4 and 5. Each of the elements depicted in FIG. 6 are interconnected by a bus 102.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 7:
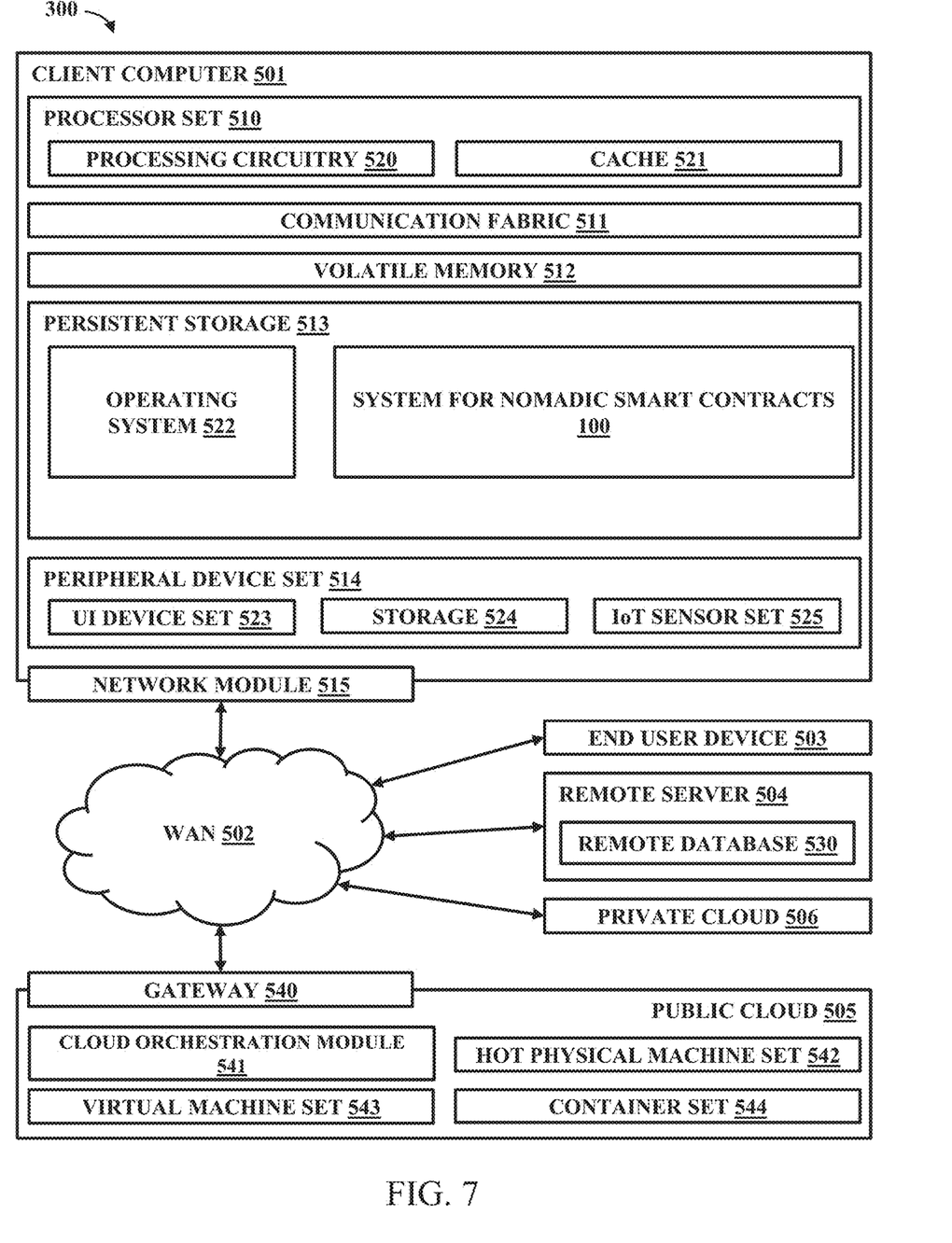
FIG. 7 depicts a computing environment according to an embodiment of the present disclosure.

Referring to FIG. 7, the computing environment 300 contains an example of an environment for the execution of at least some of the computer code involved in performing the inventive methods, such as the method for the system 100. In addition to block 100, computing environment 300 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 100, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 501, to keep the presentation as simple as possible.

Computer 501 may be located in a cloud, even though it is not shown in a cloud in FIG. 12. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 300, at least some of the instructions for performing the inventive methods may be stored in block 200 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 100 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 101 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 101 to communicate with other computers through WAN 102. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515. WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, in one embodiment a computer program product is described for managing nomadic smart contracts. The computer program product may include a computer readable storage medium having computer readable program code embodied therewith, the program instructions executable by a processor to cause the processor to cross-compile different decentralized ledgers; and generate at least one smart contract that adheres to the rules of a ledger being targeted from the decentralized ledgers. The computer program product can also model the at least one smart contract as a state machine, and verify each of the at least one smart contracts according to a verification process. In some embodiments, each of the decentralized ledgers having an equivalent state machine that runs smart contract logic and generate deterministic results to achieve consensus. The computer program product can then install the at least one smart contracts that complete the verification process across the different decentralized ledgers, approve the at least one smart contracts with a verification process for confirming equivalency to deploy across the decentralized ledgers, and deploy using the hardware processor, the smart contracts across the decentralized ledgers.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method for managing nomadic smart contracts (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method for managing smart contracts comprising:
cross-compiling different decentralized ledgers;
generating at least one smart contract that adheres to rules of a ledger being targeted from the different decentralized ledgers;
modeling the at least one smart contract as a state machine;
verifying each of the at least one smart contract according to a verification process illustrating each of the different decentralized ledgers have an equivalent to the state machine that runs to achieve consensus;
installing the at least one smart contract that achieves the consensus across the different decentralized ledgers;
approving the at least one smart contract with a verification process for confirming equivalency to deploy across the different decentralized ledgers; and
deploying the at least one smart contract across the different decentralized ledgers, wherein the deploying the at least one smart contract across the decentralized ledgers comprises data migration across the different decentralized ledgers based upon a triggering event.

2. The computer implemented method of claim 1, wherein the different decentralized ledgers have a compatible plugin.

3. The computer implemented method of claim 1, wherein the verifying each of the at least one smart contract includes checking the at least one smart contract for correctness and equivalency.

4. The computer implemented method of claim 1, wherein the data migration includes an architecture including at least one relay that is an entity that operate ledger specific drivers to route cross network requests and responses between different ledgers.

5. The computer implemented method of claim 4, wherein the at least one relay includes an enterprise system of record that provides transaction provenance between ledgers.

6. The computer implemented method of claim 1, wherein the at least one smart contract interacts with off-chain external data sources via oracles to collect data as input for the at least one smart contract.

7. The computer implemented method of claim 1, wherein the triggering event is when a cost to invoke the at least one smart contract exceeds a preset threshold value.

8. The computer implemented method of claim 1, wherein the triggering event is selected from the group consisting of size of memory pool, hash rate and combinations thereof.

9. A system for managing smart contracts including a hardware processor and a memory that stores a computer program product, the computer program product of the system includes instructions comprising:
cross-compile, using the hardware processor, different decentralized ledgers;
generate, using the hardware processor, at least one smart contract that adheres to rules of a ledger being targeted from the different decentralized ledgers;
model, using the hardware processor, the at least one smart contract as a state machine;
verify, using the hardware processor, each of the at least one smart contract according to a verification process illustrating each of the different decentralized ledgers have an equivalent to the state machine that runs to achieve consensus;

install, using the hardware processor, the at least one smart contract that achieves the consensus across the different decentralized ledgers;

approve, using the hardware processor, the at least one smart contract with a verification process for confirming equivalency to deploy across the different decentralized ledgers; and deploy, using the hardware processor, the at least one smart contract across the different decentralized ledgers, wherein the deploying the at least one smart contract across the different decentralized ledgers comprises data migration across the different decentralized ledgers based upon a triggering event.

10. The system of claim 9, wherein the different decentralized ledgers have a compatible plugin.

11. The system of claim 9, wherein the verifying each of the at least one smart contract includes checking the at least one smart contract for correctness and equivalency.

12. The system of claim 9, wherein the data migration includes an architecture including at least one relay that is an entity that operate ledger specific drivers to route cross network requests and responses between different ledgers.

13. The system of claim 12, wherein the at least one relay includes an enterprise system of record that provides transaction provenance between ledgers.

14. The system of claim 9, wherein the at least one smart contract interacts with off-chain external data sources via oracles to collect data as input for the at least one smart contract.

15. The system of claim 9, wherein the triggering event is when a cost to invoke the at least one smart contract exceeds a preset threshold value.

16. The system of claim 9, wherein the triggering event is selected from the group consisting of size of memory pool, hash rate and combinations thereof.

17. A computer program product for managing smart contracts, the computer program product including a computer readable storage medium having computer readable program code embodied therewith, the computer readable program code executable by a processor to cause the processor to:

cross-compile different decentralized ledgers;

generate at least one smart contract that adheres to rules of a ledger being targeted from the different decentralized ledgers;

model the at least one smart contract as a state machine;

verify each of the at least one smart contract according to a verification process illustrating each of the different decentralized ledgers have an equivalent to the state machine that runs to achieve consensus;

install the at least one smart contract that achieves the consensus across the different decentralized ledgers;

approve the at least one smart contract with a verification process for confirming equivalency to deploy across the different decentralized ledgers; and deploy the at least one smart contract across the different decentralized ledgers, wherein to deploy the at least one smart contract across the different decentralized ledgers comprises data migration across the different decentralized ledgers based upon a triggering event.

* * * * *